(12) United States Patent
Otosaka (10) Patent No.: US 8,904,825 B2
(45) Date of Patent: Dec. 9, 2014

(54) APPARATUS FOR FABRICATING A GLASS ROD AND METHOD OF SAME (75) Inventor: Tetsuya Otosaka, Annaka (JP)

(73) Assignee: Shin-Etsu Chemical Co., Ltd, Tokyo (JP)

( * ) Notice: Subject to any disclaimer, the term of this patent is extended or adjusted under 35 U.S.C. 154(b) by 154 days.

(21) Appl. No.: 13/226,609

(22) Filed: Sep. 7, 2011

(65) Prior Publication Data
US 2012/0055198 A1 Mar. 8, 2012

(30) Foreign Application Priority Data

Sep. 8, 2010 (JP) ................................. 2010-200504
Sep. 6, 2011 (JP) ................................. 2011-194105

(51) Int. Cl.
C03B 37/012 (2006.01)
(52) U.S. Cl.
CPC .............................. C03B 37/01242 (2013.01)
USPC ................................. 65/381; 65/486; 65/435
(58) Field of Classification Search
CPC ..................... C03B 37/01242; C03B 2205/40; C03B 2205/44
USPC ........................................... 65/381, 486, 435
See application file for complete search history.

(56) References Cited

U.S. PATENT DOCUMENTS

| 5,314,517 | A | | 5/1994 | Koenig | |
|---|---|---|---|---|---|
| 5,755,849 | A | * | 5/1998 | Hoshino et al. | 65/381 |
| 6,134,922 | A | | 10/2000 | Shimada | |
| 6,220,057 | B1 | | 4/2001 | Yamamura | |
| 6,324,871 | B1 | * | 12/2001 | Nakamura et al. | 65/421 |
| 2005/0132753 | A1 | * | 6/2005 | Shimizu et al. | 65/381 |
| 2006/0086148 | A1 | * | 4/2006 | Mileo et al. | 65/382 |
| 2009/0260401 | A1 | | 10/2009 | Shin et al. | |

FOREIGN PATENT DOCUMENTS

| CN | 101481210 A | 7/2009 |
|---|---|---|
| JP | 61-014149 | 1/1986 |
| JP | 63-195139 | 8/1988 |
| JP | 2-275723 | 11/1990 |
| JP | 11-011970 | 1/1999 |
| JP | 2004-189579 | 7/2004 |
| JP | 2005-145765 | 6/2005 |

(Continued)

OTHER PUBLICATIONS

Extended European Search Report in Application No. EP11180370, Dec. 21, 2011.
Extended European Search Report dated Dec. 19, 2011 in related European Application No. EP 11180378.9.
U.S. Appl. No. 13/226,656, filed Mar. 5, 2013, Office Action.

(Continued)

Primary Examiner — Queenie Dehghan
(74) Attorney, Agent, or Firm — Workman Nydegger (57) ABSTRACT The present invention provides an apparatus and a method for fabricating a glass rod from a glass preform capable of suppressing a diameter fluctuation of the drawn glass rod even when there is a relatively large diameter reduction ratio between the glass preform and the glass rod, such as 60 to 95%. The feed speed V1 of the glass preform is set to a constant value, the diameter D of the glass preform is acquired for determining the drawing speed V2 from diameter data of the glass preform measured before being drawn at a diameter acquisition position defined with respect to a reference position of the furnace. The distance from the reference position to the diameter acquisition position is defined so as to vary depending on a diameter fluctuation of the glass preform before being drawn in a longitudinal direction thereof.

8 Claims, 8 Drawing Sheets

(56) References Cited

FOREIGN PATENT DOCUMENTS

| | | | |
|---|---|---|---|
| JP | 2005145765 A * | 6/2005 | ............ C03B 37/012 |
| JP | 2005-289774 | 10/2005 | |
| JP | 2006-193397 | 7/2006 | |
| JP | 2006-219331 | 8/2006 | |
| WO | 2005/056487 | 6/2005 | |

OTHER PUBLICATIONS

Office Action dated Sep. 27, 2013 from corresponding Chinese Patent Application No. 201110268775.3.
U.S. Appl. No. 13/226,656, filed Jul. 10, 2014, Non-Final Office Action.
Chinese Office Action from related Chinese Application No. 201110268760.7, dated Sep. 10, 2013.
U.S. Appl. No. 13/266,656, filed Jul. 25, 2013, Final Office Action.

* cited by examiner

APPARATUS FOR FABRICATING A GLASS ROD AND METHOD OF SAME

CROSS-REFERENCE TO RELATED APPLICATIONS

This application claims the benefit of Japanese Patent Application Nos. 2010-200504, filed Sep. 8, 2010 and 2011-194105, filed Sep. 6, 2011 which are hereby incorporated by reference herein in their entirety.

BACKGROUND OF THE INVENTION

1. Field of the Invention

The present invention relates to an apparatus for fabricating a glass rod and a method of the same, in particular, to an apparatus and method for fabricating a glass rod having a desirable diameter by feeding a relatively large diameter glass preform such as an optical fiber glass ingot in a furnace, heating the preform in the furnace and drawing the heated preform from the furnace.

2. Description of the Related Art

Japanese Patent Laid-Open No. 2006-193397 discloses a method for fabricating a glass rod having a desirable diameter by measuring a diameter of a preform during drawing at a region where a deformation (diameter reduction) is progressing and a diameter at a region where the diameter reduction is almost completed, and adjusting a feed speed and a drawing speed of the glass preform with respect to a furnace based on these measured diameters.

The description of conventional art in Japanese Patent Laid-Open No. H11-011970(1999) discloses a method of pre-measuring a diameter of a glass preform along a longitudinal direction thereof, determining a ratio between a feed speed and a drawing speed of the preform, and fabricating a constant diameter glass rod based on the ratio.

Japanese Patent Laid-Open No. 2006-219331 discloses suppressing a diameter fluctuation of a drawn glass rod caused by a shifting of a reference position defining a feed speed and a drawing speed of a glass preform as a drawing process progress, by changing the amount of a feed and the reference diameter distance of the glass preform.

Conventionally, the ratio of the target diameter of a glass rod with respect to the diameter of a glass preform (referred to as a diameter reduction ratio below) has been about 20% to 50% and relatively small. Accordingly, the control method of Japanese Patent Laid-Open No. 2006-193397 could suppress the fluctuation of diameter to a required level. Recently, however, a larger size optical fiber preform is required, and a glass rod having a relatively small diameter deformation, in which a diameter reduction ratio is about 60% to 95%, is required. For example, when a 160 mm to 170 mm diameter glass preform is drawn into a 150 mm diameter glass rod, the diameter reduction ratio is 88% to 94%.

To implement the feedback control disclosed in Japanese Patent Laid-Open No. 2006-193397, it is necessary to measure the diameter at around a position where the diameter is substantially reduced in a diameter decreasing region. In case of a relatively large diameter reduction ratio, however, a position where the diameter is substantially reduced is adjacent the heater in a furnace. Accordingly, it is difficult to directly measure the diameter at this position. If the diameter used for the feedback control is measured at a location spaced from the heater to some extent so as to prevent an affection of the heater, the response of the feedback control could be lagged. Thus the feedback control may not be appropriately implemented. As a result, a large fluctuation can be generated in a drawn glass rod.

According to the method disclosed in Japanese Patent Laid-Open No. H11-011970(1999), a relatively desirable diameter fluctuation value can be obtained even at a diameter reduction ratio of 60% to 95% in the case of a stable constant diameter glass preform. The method, however, may cause an unacceptable diameter fluctuation (specifically, more than ±1%) at an end portion of a usable region in a drawn glass rod at the end of the drawing process, when the glass preform has a relatively large diameter fluctuation in a longitudinal direction thereof.

The method disclosed in Japanese Patent Laid-Open No. 2006-219331 can suppress a diameter fluctuation of a glass rod. In the method, however, a criterion for changing the reference diameter position is indefinite, and an unacceptable diameter fluctuation may be generated depending on a condition of the diameter fluctuation of the glass preform. In addition, in the embodiment of the publication, a 130 mm diameter glass preform is drawn into a 30 mm diameter glass rod, that is, the diameter reduction ratio is considerably small such as 23%. The publication fails to disclose a method for suppressing a diameter fluctuation of a drawn glass rod in case of a relatively large diameter ratio such as 60 to 95%.

SUMMARY OF THE INVENTION

The present invention provides an apparatus and a method for fabricating a glass rod capable of suppressing a diameter fluctuation of a drawn glass rod even in case of a relative large diameter reduction ratio between a glass preform and a glass rod, such as 60 to 95%.

A first aspect of the present invention provides a method of fabricating a glass rod, the method feeding a relatively large diameter glass preform into a furnace through a top portion thereof and drawing the glass preform from the furnace through a bottom portion thereof so that the relatively large diameter glass preform is drawn into a relatively small diameter glass rod, including the steps of:

controlling a feed speed (V1) and a drawing speed (V2) of the glass preform so that a ratio (V2/V1) between the feed speed (V1) and the drawing speed (V2) becomes a value $((D/d)^2)$ determined based on a diameter (D) of the glass preform and a target diameter (d) of the glass rod;

setting the feed speed (V1) of the glass preform to a constant value; and acquiring the diameter (D) of the glass preform for determining the drawing speed (V2) from a measured diameter data of the glass preform before being drawn at a diameter acquisition position defined with respect to a reference position of the furnace, wherein a distance from the reference position to the diameter acquisition position is defined so as to vary depending on a diameter fluctuation of the glass preform before being drawn in a longitudinal direction thereof.

A second aspect of the present invention provides an apparatus for fabricating a glass rod, including:

a furnace;

a feeding mechanism configured to feed a relatively large diameter glass preform into a furnace through a top portion thereof;

a drawing mechanism configured to draw the glass preform from the furnace through a bottom portion thereof so that the relatively large diameter glass preform is drawn into a relatively small diameter glass rod;

a controller configured to control a feed speed (V1) of the glass preform by the feeding mechanism and a drawing speed (V2) of the preform by the drawing mechanism so that a ratio (V2/V1) between the feed speed (V1) and the drawing speed (V2) becomes a value ($(D/d)^2$) determined based on a diameter (D) of the glass preform and a target diameter (d) of the glass rod, wherein the controller comprises:

a setting unit configured to set the feed speed (V1) of the glass preform to a constant value;

an acquisition unit configured to acquire the diameter (D) of the glass preform for determining the drawing speed (V2) from a measured diameter data of the glass preform before being drawn at a diameter acquisition position defined with respect to a reference position of the furnace, wherein a distance from the reference position to the diameter acquisition position is defined so as to vary depending on a diameter fluctuation of the glass preform before being drawn in a longitudinal direction thereof.

According to the present invention, a diameter for determining a drawing speed is acquired from a measured diameter data of a glass preform before being drawn, and a distance from a reference position of a heater with respect to a diameter acquisition position for acquiring the diameter is adjusted depending on a diameter fluctuation of the glass preform. Thereby, the diameter acquisition position can be modified depending on a diameter reference distance, which changes in accordance with the diameter fluctuation of the glass preform. As a result, a drawing speed can be determined based on a diameter responding to the drawing reference distance, so that a diameter fluctuation of a drawn glass rod in a longitudinal direction of the glass rod can be suppressed.

Further features of the present invention will become apparent from the following description of exemplary embodiments (with reference to the attached drawings).

DESCRIPTION OF THE EMBODIMENTS

Figure 1:
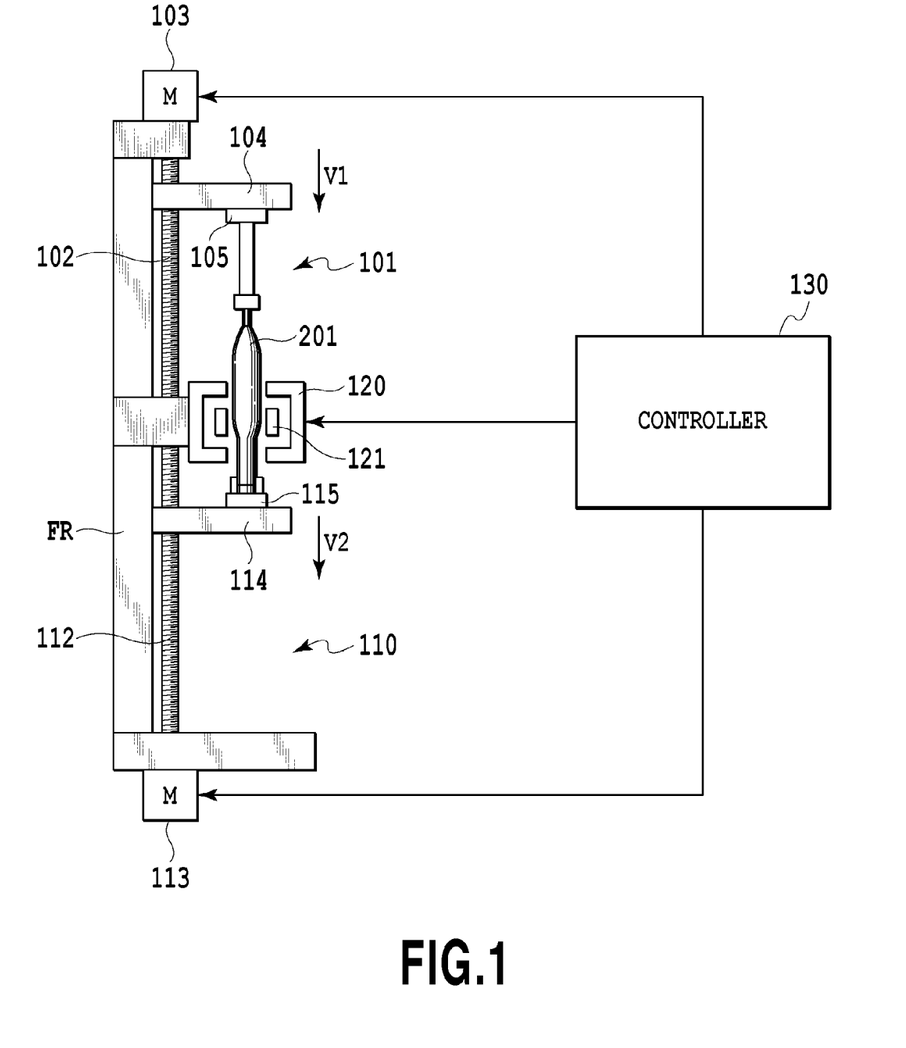
FIG. 1 is a view schematically showing an apparatus for fabricating a glass rod according to an embodiment of the present invention.

An embodiment of the present invention will be described below with reference to the attached drawings. FIG. 1 schematically shows an apparatus for fabricating a glass rod according to an embodiment of the present invention. The fabricating apparatus has a feeding mechanism 101 and a drawing mechanism 110, which are disposed on a frame FR vertically extending, respectively, a furnace 120 disposed on the frame between the feeding mechanism 101 and the drawing mechanism 110, and a controller 130.

The feeding mechanism 101 has a screw shaft 102 vertically extending and rotatably supported, a motor 103 for driving the screw shaft 102, a movable member 104 into which the screw shaft 102 is screwed, and a chucking mechanism 105 which is disposed on the movable member 104 and holds an upper end portion of an optical fiber glass preform 201.

The drawing mechanism 110 has a screw shaft 112 vertically extending and rotatably supported, a motor 113 for driving the screw shaft 112, a movable member 114 into which the screw shaft 112 is screwed, and a chucking mechanism 115 which is disposed on the movable member 114 and holds a lower end portion of the optical fiber glass preform 201.

The furnace 120 has an annular shaped heater 121 therein, and heats an optical fiberglass preform 201 passing through a central portion of the heater 121.

The controller 130 is constituted of hardware such as a processor and a memory, and required software, and is electrically connected to the motors 103 and 113, and to the furnace 120. Specifically, the controller 130 controls rotational velocities of the motors 103 and 113, and a temperature in the furnace 120.

Drawing of a glass preform by the apparatus in FIG. 1 will be described. First, a glass preform 201 having a relatively large diameter is fed into the furnace 120 through the top portion thereof by the feeding mechanism 101. The glass preform 201 fed into the furnace 120 is drawn from the furnace 120 through a bottom portion thereof by the drawing mechanism 110 so that the glass preform 201 is drawn so as to be a relatively small diameter glass rod. At that time, the feeding mechanism 101 and the drawing mechanism 110 are controlled so that a ratio V2/V1 between a feed speed V1 and a drawing speed V2 of the glass preform 201 becomes a value $(D/d)^2$ which is defined from the glass preform diameter D and the glass rod target diameter d. That is, the feed speed V1 and the drawing speed V2 are controlled so that a relation defined by the following formula (1) is satisfied.

$$V2/V1=(D/d)^2 \qquad (1)$$

In the present embodiment, the feed speed V1 of the glass preform is set to a constant value for a drawing control. As the glass preform diameter D is used to determine the drawing speed V2, the preform diameter is determined before the glass preform is drawn at a diameter acquisition position. The diameter acquisition position is defined with respect to a reference position of the furnace from measured diameter data which are obtained to measure the glass preform along the longitudinal length of the glass preform. The distance from the reference position in the furnace to the diameter acquisition position is determined so as to vary depending on the glass preform diameter fluctuation before being drawn in a longitudinal direction thereof. In particular, the distance from the reference position in the furnace to the diameter acquisition position is determined so as to be equal to a drawing reference distance, which will be described later.

Figure 2:
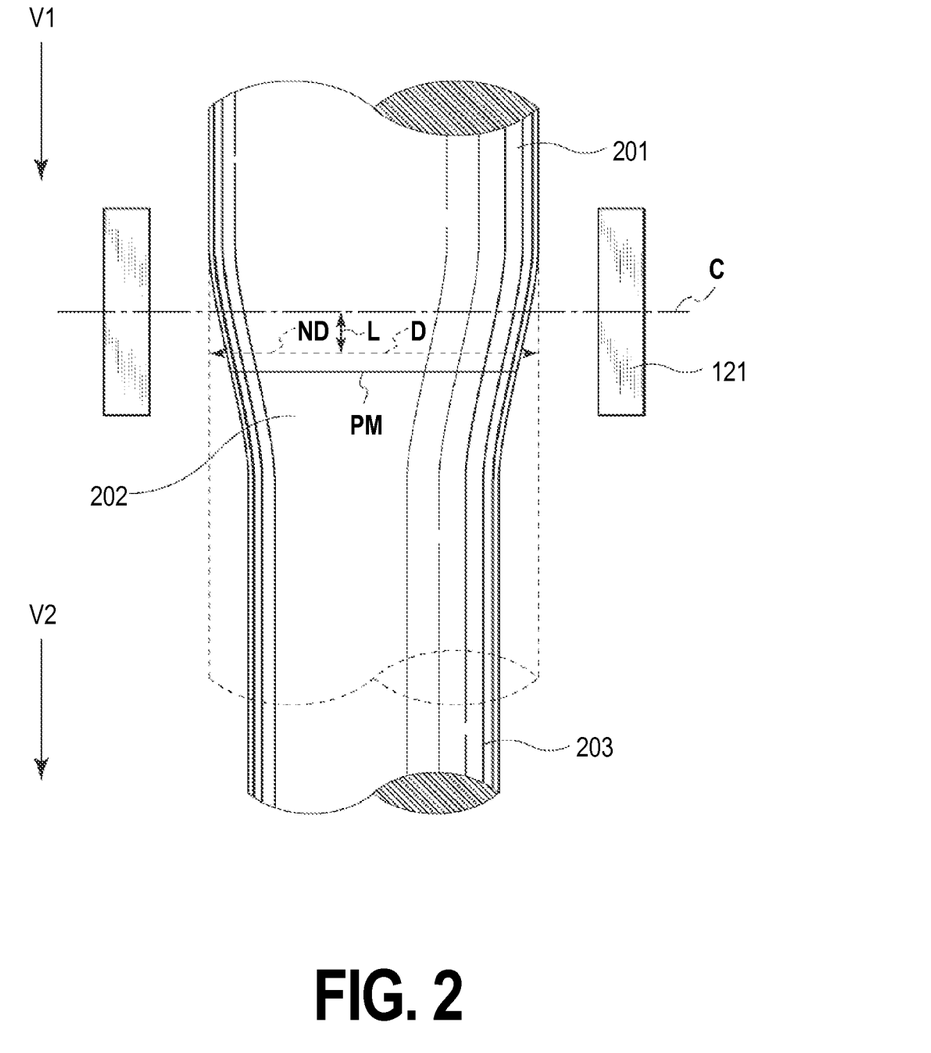
FIG. 2 is a schematic view for explaining a drawing reference distance in a diameter decreasing region.

Next, the drawing reference distance will be discussed with reference to FIG. 2. The glass preform 201 is fed into the furnace 120 through the top portion of the furnace 120 at the feed speed V1, heated by the heater 121, and drawn from the furnace 120 through the bottom portion of the furnace 120. Here, a tension is induced on the glass preform 201 by setting V2>V1. A heated and softened region of the glass preform 201 is stretched due to the tension so that a diameter decreasing region 202 is formed where the diameter is gradually reduced in the longitudinal direction. The diameter of the glass preform 201 decreases in the diameter decreasing region 202 to thereby form a relatively small diameter glass rod 203.

The glass preform 201 fed into the furnace 120 is heated by the heater 121 so that the temperature of the preform 201 in the longitudinal direction reaches a maximum temperature at a position below a middle position C of the heater 121 and gradually decreases from the maximum temperature position downward. Accordingly, a position PM where a deformation rate (an amount of diameter reduction per unit length in the longitudinal direction) is largest is located below the heater middle position C at any time.

Here, VM indicates a volume of the glass preform 201 from the heater middle position C to the position PM, ND indicates a diameter of the glass preform 201 before being drawn, L indicates a drawing reference distance. In the present embodiment, the drawing reference distance L is defined by the following formula (2).

$$L = VM / (\pi \times (ND/2)^2) \quad (2)$$

The drawing reference distance L is defined based on the distance from the heater middle position C to the position on the glass preform being drawn, and varies depending on the feed speed and the diameter of the glass preform before being drawn, as described later. That is, the drawing reference distance L is the distance between the heater middle position C and a specific position which is defined depending on the deformation condition of the diameter decreasing region on the glass preform. Accordingly, the drawing reference distance L is dependent on the position PM in the diameter decreasing region 202, where the deformation rate is largest.

In the present embodiment, the diameter of the glass preform corresponding to the drawing reference distance is used for the drawing control. By controlling the diameter of the glass preform corresponding to the drawing reference distance, the diameter of the drawn glass preform can be controlled with higher precision. The diameter fluctuation region, however, is located close to the heater 121 so that it is difficult to directly measure its shape during drawing. Accordingly, in the present embodiment, the drawing reference distance can be calculated or estimated from a preliminary experiment or data when being drawn in a steady state.

Figure 3A:
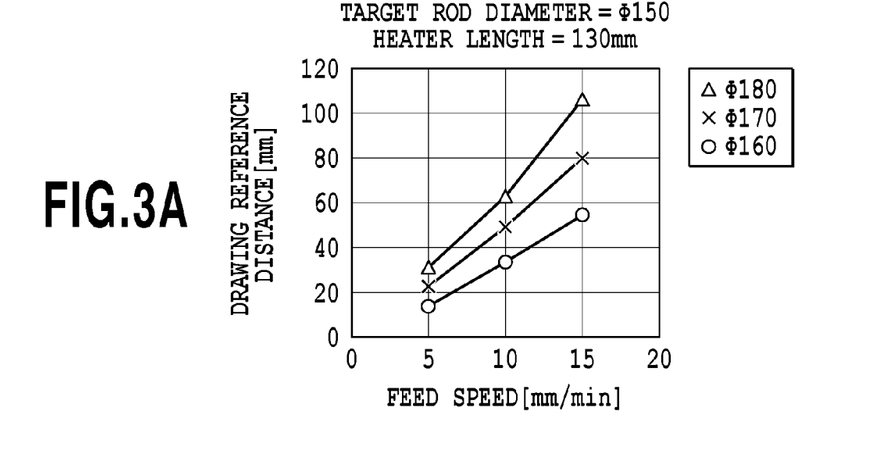
FIG. 3A is a graph showing a relation between a drawing reference distance and a feed speed in case where 160, 170 and 180 mm diameter glass preforms are drawn into 150 mm target diameter glass rods.
Figure 3B:
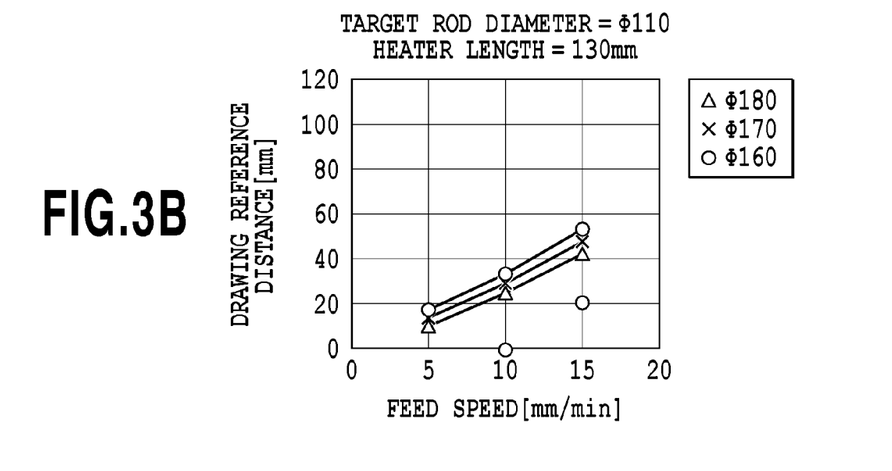
FIG. 3B is a graph showing a relation between a drawing reference distance and a feed speed in case where 160, 170 and 180 mm diameter glass preforms are drawn into 110 mm target diameter glass rods.

The present inventor investigated the relationship between the drawing reference distance L, the feed speed V1 and the diameter D of the glass preform before being drawn. In particular, the glass preform diameter D, the glass rod target diameter d and the feed speed V1 were set to a variety of values, and the drawing reference distance L was measured from the actual shape of the diameter decreasing region 202. The results are shown in FIGS. 3A and 3B. FIG. 3A shows the relationship between the drawing reference distance and the feed speed in cases where 160, 170 and 180 mm diameter glass preforms were drawn into 150 mm target diameter glass rods, respectively. FIG. 3B shows the relationship between the drawing reference distance and the feed speed in cases where 160, 170 and 180 mm diameter glass preforms were drawn into 110 mm target diameter glass rods. As can be seen from the relationship between the feed speed and the glass preform diameter with respect to the plurality of drawing reference distances, the drawing reference distance L varies depending on the glass preform diameter and the feed speed.

It can be seen from the relationship between the feed speed and the glass preform diameter with respect to the plurality of drawing reference distances shown in FIGS. 3A and 3B, that the drawing reference distance varies depending on the glass preform diameter and the feed speed in various ways. The bigger the glass preform diameter is before being drawn, the longer the drawing reference distance is. And, the greater the feed speed is, the longer the drawing reference distance is.

As can be seen from FIG. 3A and FIG. 3B, if the feed speed and the glass preform diameter remain constant during drawing of the glass preform, the drawing reference distance remains at a constant value. However, if fluctuations exist in the diameter of the glass preform in the longitudinal direction thereof, the drawing reference distance may also fluctuate even though the feed speed of the glass preform is kept constant. For this reason, in the present embodiment, the feed speed is kept constant during drawing of the glass preform and the diameter acquisition position on the glass preform is changed dependent on fluctuations of the diameter of the glass preform. That is, in the present embodiment, the distance from the heater reference position to the diameter acquisition position of the glass preform is set so as to be equal to the fluctuating drawing reference distance.

To determine the drawing reference distance, data defining the relationship between the diameter of the glass preform before being drawn and the drawing reference distance, as shown in FIGS. 3A and 3B can be used.

It is difficult to prepare drawing reference distance data with respect to all of the fluctuated diameters of the glass preform. For this reason, in the present embodiment, by interpolating between data points in the diameter and drawing reference distance data as shown in FIGS. 3A and 3B, the drawing reference distance can be determined for any given position on the glass preform in the longitudinal direction of the glass preform thereby determining the diameter acquisition position to be used when the given position reaches the heater middle position C.

In the case where the diameter of the usable region in the glass preform substantially linearly varies, drawing reference distances at two points (a start position and a drawing ending position) of the usable region is determined using diameter drawing reference distance data. And, by linearly interpolating the drawing reference distance at these two points, the drawing reference distance at any given position between the two points can be calculated. That is, in the case where the diameter of the glass preform before being drawn varies linearly, the drawing reference distance at any given position between the two points also changes linearly. In addition, in the case where the diameter of the glass preform does not vary linearly in the longitudinal direction, the drawing reference distance at any given position can be obtained by dividing the usable region into a plurality of interpolation regions, determining drawing reference distances at both ends of each of the interpolation regions from the diameter drawing reference distance data, and interpolating the drawing reference distance at both ends of each of the interpolation regions. Note that an interpolating manner is not limited to this manner, and another interpolating manner can be employed.

Figure 4:
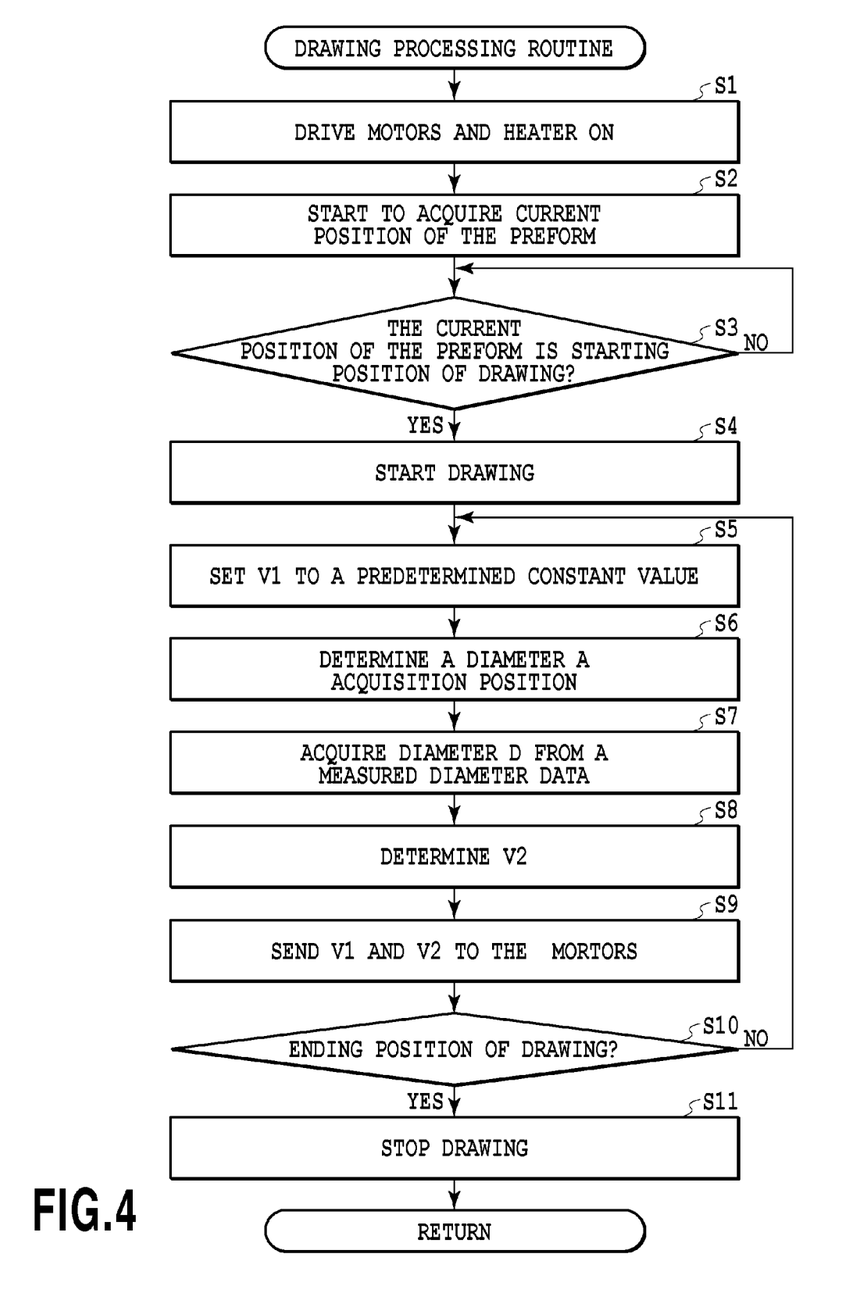
FIG. 4 is a flow chart showing an example of a drawing processing by the controller of FIG. 1.

Next, an example of a drawing process by the above controller will be described with reference to FIG. 4. First, a glass preform 201 having a pre-measured diameter is positioned on the apparatus of FIG. 1, and the heater 121 is switched on and the motors 103 and 113 are driven to feed the glass preform 201 into the furnace 120 (S1).

If starting to heat the glass preform from a drawing start position of a usable region of the glass preform which can be used for forming the glass rod, a diameter fluctuation may be generated on the drawing start side of the preform because the temperature distribution of the preform is not yet in a steady state. To prevent this, it is necessary to start to heat the glass preform so as to make a temperature distribution at the drawing start position steady before the drawing start position of the usable region of the glass preform reaches the heater middle position C in furnace 120. The length of the region between the position to start heating the glass preform and the drawing start position of the usable region of the glass preform (which is referred to as a preliminary heating region below) is preferably set to be greater than or equal to the length of the heater to stabilize the temperature distribution. Extending the preliminary heating region more than necessary is disadvantageous in production efficiency because of a large loss of the glass preform, so the length of the preliminary heating region is preferably set to be less than three times of the length of the heater.

Next, acquisition of the current position of the glass preform 201 in the longitudinal direction relative to the furnace 120 is started (S2). The current position of the glass preform 201 relative to the heater 121 can be acquired using, for example, a rotational position detector (not shown in the figures) incorporated in the motor 103. Next, it is determined if the drawing start position of the glass preform 201 has reached the position where the drawing start position is spaced from the heater middle position C by a predetermined distance which is set to be the specific drawing reference distance. If it has, the drawing process is started (S4).

With the drawing process being started, the feed speed V1 is set to a predetermined constant value (S5). Next, the diameter acquisition position of the glass preform before being drawn is determined (S6). Here, a method of determining the diameter acquisition position will be described, for example, in a case where the length of the usable portion in the glass preform is 1000 mm, the drawing reference distance at the drawing start position is 40 mm, and the drawing reference distance at the drawing ending position is 60 mm. The drawing start position of the usable region in the glass preform is set to a position below the heater middle position C by 40 mm. The location of the drawing ending position with respect to the heater middle position C when the diameter at the drawing ending position is acquired is positioned below the location of the drawing start position with respect to the heater middle position C by 20 mm (=60−40). Accordingly, the total amount of feed of the glass preform is set to 1020 mm. And, multiplying the actual amount of feed of the glass preform by 1000/1020 gives an interpolated diameter acquisition position.

With the drawing process being started, a diameter at the calculated diameter acquisition position is acquired from the measured diameter data (S7). A drawing speed V2 is determined using the acquired diameter by the formula (1) (S8). A control command in accordance with the determined feed speed V1 and drawing speed V2 is sent to the motors 103 and 113 (S9).

Next, whether the glass preform has reached the ending position is determined (S10). If the glass preform has not reached the ending position, the steps S5 to S9 are repeated. Otherwise, the drawing process is terminated (S11).

The method of the present embodiment provides a great technical effect especially when the glass rod target diameter d is from 60 to 95% of the glass preform diameter D. As can be seen from a comparison between FIG. 3A and FIG. 3B, the amount of change of drawing reference distance associated with variation of the feed speed and the diameter becomes relatively larger in a drawing process with a relative large diameter reduction ratio in which a 160 mm diameter glass preform is drawn into a 150 mm diameter glass rod and the ratio is 94%. Specifically, in the case of such a relatively large diameter reduction ratio, the present invention is so useful in drawing. Also, the change of drawing reference distance associated with a variation in the glass preform diameter can be seen even in the drawing of a relative small diameter reduction ratio such as from a 180 mm diameter glass preform to a 110 mm diameter glass rod as shown in FIG. 3B, however, the amount of the change is relatively small. When the diameter reduction rate is less than 60%, a conventional method can be used, and the method of the present invention also can provide a desirable result. On the other hand, when the diameter reduction rate is over 95%, it is difficult to maintain an appropriate drawing load during drawing so that a drawn glass rod may have some deflection.

Conventionally, if the diameter fluctuation of the glass rod becomes large when the diameter is reduced in a drawing furnace, the diameter fluctuation can be modified by re-drawing using an existing glass lathe. However, if the glass rod diameter is more than 110 mm, it becomes difficult or impossible to re-draw because heat efficiency falls in re-drawing using existing glass lathes. Accordingly, if the glass rod target diameter is over 110 mm, a glass rod having a decreased diameter fluctuation cannot be fabricated without using the drawing process of the present invention. In such case, the present invention provides effectiveness.

Example 1

A glass preform having tapered portions at both ends thereof, a 1000 mm length of usable region thereof, a diameter of 160 mm at a drawing start position of the usable region, a diameter of 172 mm at a drawing ending position of the usable region, and a diameter in the usable region linearly varying in the longitudinal direction was drawn under conditions where the heater length was 130 mm, the glass rod target diameter was 150 mm, and the feed speed was 10 mm/min. Drawing reference distances were determined using the data of FIG. 3A; as such drawing reference distances were determined to be 33 mm and 52 mm on the drawing start side and on the drawing ending side, respectively. A 200 mm length of the preliminarily heated region was set on the drawing start side. The glass preform was positioned so that the drawing start position of the usable region on the drawing start side was located 167 mm above the heater middle position C and drawing was started at a heater temperature of 2050 degrees Celsius. A portion of the tapered portion on the drawing start side that had a diameter greater than 150 mm was drawn at a drawing speed calculated using the formula (1) while the target diameter of the portion was set to the 150 mm glass rod target diameter.

Figure 5:
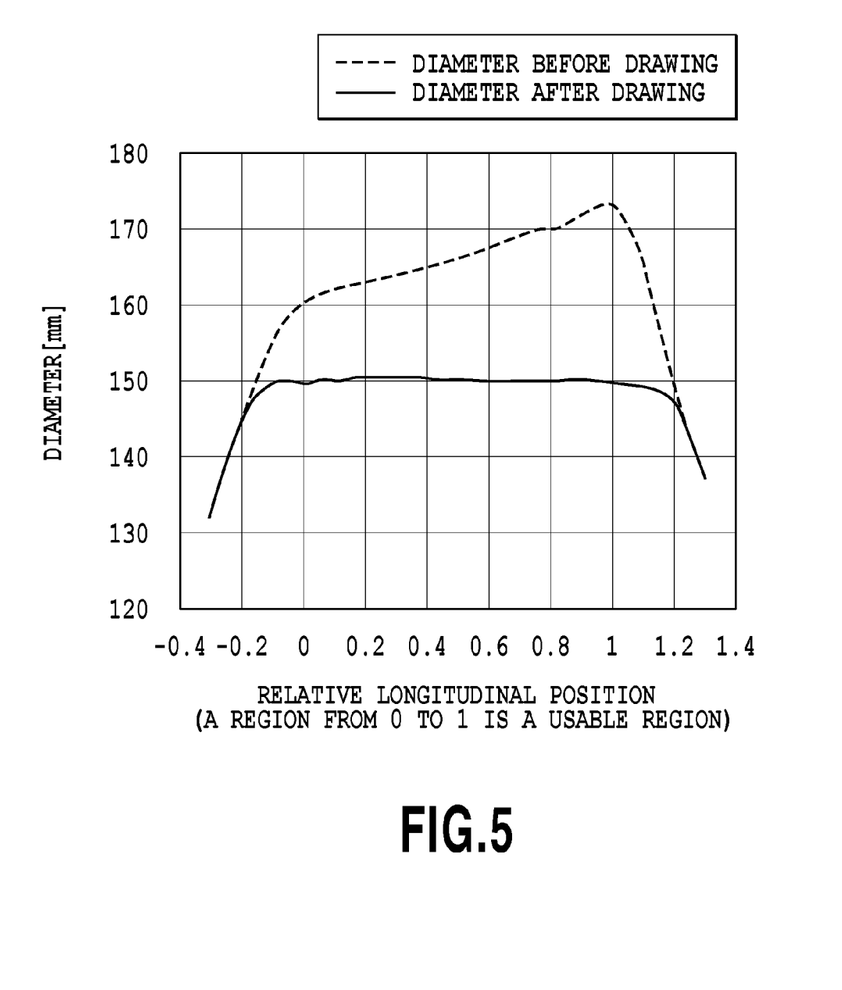
FIG. 5 is a graph showing a diameter fluctuation of a glass preform before and after drawing in Example 1.

A feed amount of the glass preform was set to 0 mm at the time point that the 200 mm length of preliminarily heated region passed through the heater middle position C. From here, the glass preform was moved 1019 mm. The feed amount of 1019 mm was determined from the usable region length of 1000 mm+(the ending position drawing reference distance of 52 mm−the start position drawing reference distance of 33 mm). During this time, the diameter acquisition distance with respect to given positions on the preform was interpolated by multiplying the actual feed amount of the glass preform by 1000/1019. And, the drawing speed V2 was calculated using formula (1) using the diameter acquired from the measured diameter data of the glass preform at the interpolated diameter acquisition distance. In addition, another 200 mm length region was further drawn after the drawing of the usable region. During this time, the feed speed was maintained at 9.0 mm/min, which was the final feed speed of the usable region. The portion of the tapered portion on the drawing ending side that had a diameter greater than 150 mm was drawn at a drawing speed calculated using the formula (1) while the target diameter of the portion was set to the 150 mm glass rod target diameter. As a result, as shown in FIG. 5, a glass rod having a significantly reduced diameter fluctuation, in which the difference between the maximum diameter and the minimum diameter is approximately 0.9 mm, could be obtained.

Comparative Example 1

A glass preform having tapered portions at both ends thereof, a 1000 mm length usable region of the glass preform, a diameter of 160 mm at a drawing start position of the usable region, a diameter of 170.5 mm at a drawing ending position of the usable region, and a diameter in the usable region linearly varying in the longitudinal direction was drawn under conditions where the heater length was 130 mm, the glass rod target diameter was 150 mm, and the feed speed was 10 mm/min. A preliminarily heated region on the drawing start side was set to be 200 mm in length. A drawing reference distance was determined to be 41 mm from the data of FIG. 3A by using a diameter of 165 mm at the middle position of the preform as a representative diameter and was constant during the drawing. The glass preform was positioned so that the drawing start position of the usable region on the drawing start side was located 159 mm above the heater middle position C and the drawing was started at a heater temperature of 2050 degrees Celsius. A portion of the tapered portion on the drawing start side that had a diameter greater than 150 mm was drawn at a drawing speed calculated using the formula (1) while the target diameter of the portion was set to the 150 mm glass rod target diameter.

Figure 6:
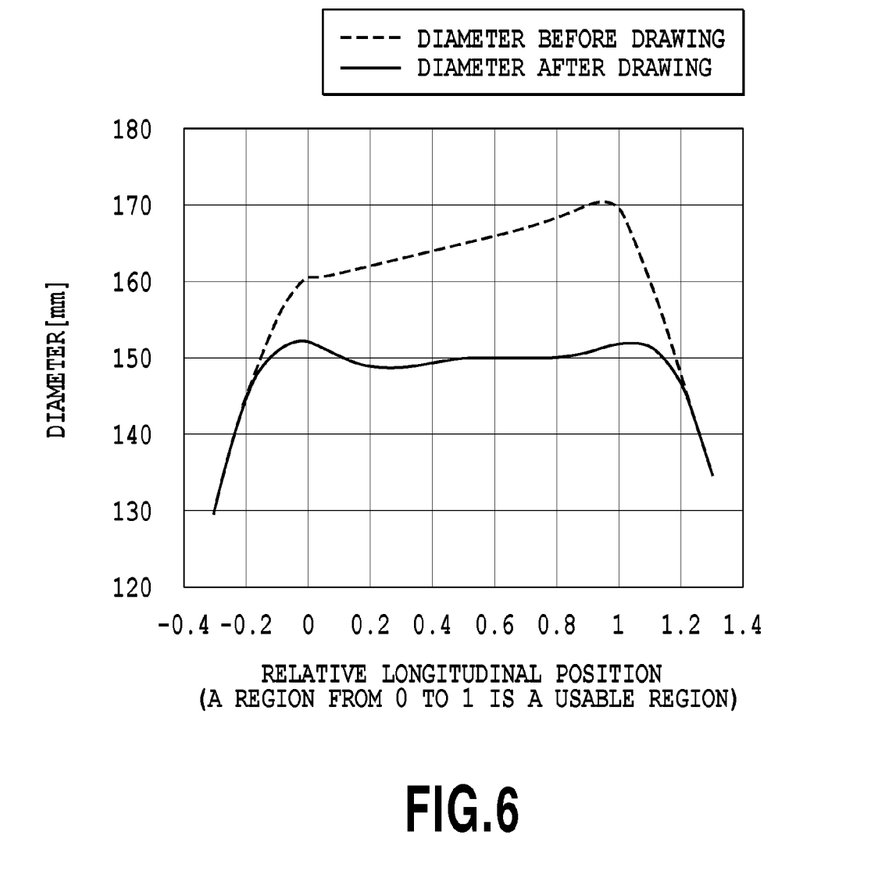
FIG. 6 is a graph showing a diameter fluctuation of a glass preform before and after drawing in Comparative example 1.

A feed amount of the glass preform was set to 0 mm at the time point that the 200 mm length of preliminarily heated region passed through the heater middle position C, and the glass preform was fed by a feed amount of 1000 mm. During this time, the drawing speed V2 at given positions in the usable region was calculated using formula (1) using the diameter at the actual feed position of the preform, which is located at the heater middle position C. Another 200 mm length region was further drawn after the drawing of the usable region. The portion of the tapered portion on the drawing start side that had a diameter greater than 150 mm was drawn at a drawing speed calculated using the formula (1) while the target diameter of the portion was set to the 150 mm glass rod target diameter. As a result, as shown in FIG. 6, the difference between the maximum diameter and the minimum diameter in the diameter fluctuation of the drawn glass rod was approximately 3.1 mm, and the diameter fluctuation of the drawn glass rod was larger than that of Example 1.

Comparative Example 2

A glass preform having tapered portions at both ends thereof, a 1000 mm length usable region of the glass preform, a diameter of 161 mm at a drawing start position of the usable region, a diameter of 172 mm at a drawing ending position of the usable region, and a diameter in the usable region linearly varying in the longitudinal direction was drawn under conditions where the heater length was 130 mm, the glass rod target diameter was 150 mm, and the feed speed was 10 mm/min. No preliminarily heated region on the drawing start side was set. Drawing reference distances on the drawing start side and on the drawing ending side were determined to be 35 mm and 53 mm from the data of FIG. 3A, respectively. The glass preform was positioned so that the drawing start position of the usable region on the drawing start side was located 35 mm below the heater middle position C and the drawing was started at a heater temperature of 2050 degrees Celsius.

Figure 7:
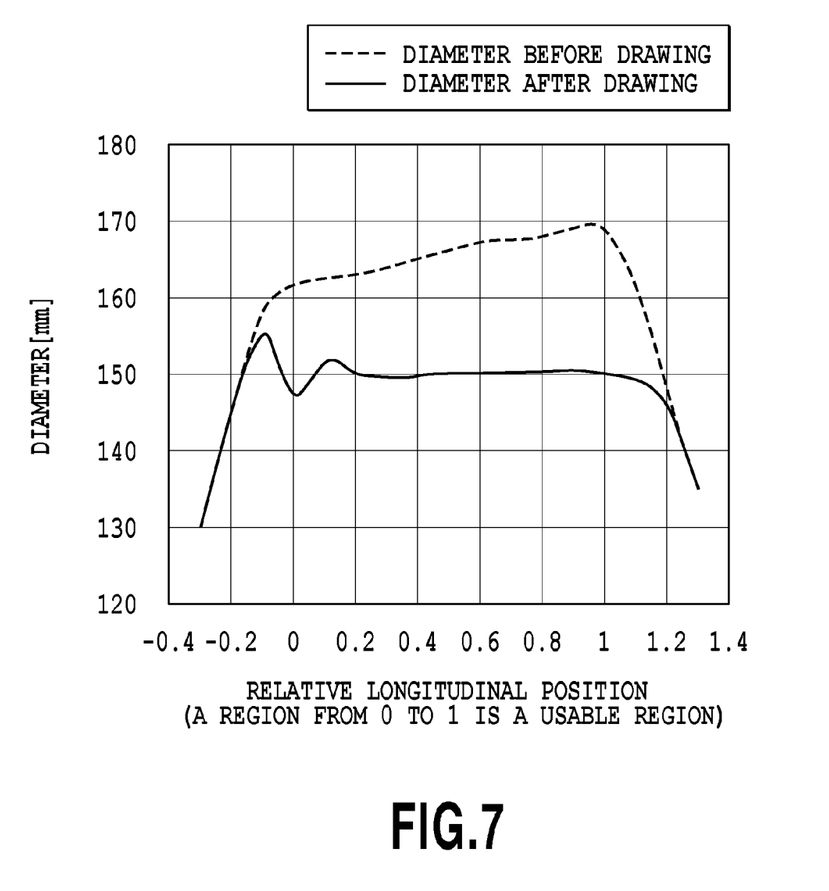
FIG. 7 is a graph showing a diameter fluctuation of a glass preform before and after drawing in Comparative example 2.

A feed amount of the glass preform at the heater middle position C when starting drawing was set to 0 mm. From here, the glass preform was moved 1018 mm. The feed amount of 1018 mm was determined from the usable region length of 1000 mm+(the ending position drawing reference distance of 53 mm−the start position drawing reference distance of 35 mm). During this time, the diameter acquisition distance with respect to given positions on the preform was interpolated by multiplying the actual feed amount of the glass preform by 1000/1018. And, the drawing speed V2 at the given positions in the usable region was calculated using formula (1) using the diameter acquired from the measured diameter data of the glass preform at the interpolated diameter acquisition distance. In addition, another 200 mm length region was further drawn after the drawing of the usable region. A portion of the tapered portion on the drawing start side that had a diameter greater than 150 mm was drawn at a drawing speed calculated using the formula (1) while the target diameter of the portion was set to the 150 mm glass rod target diameter. As a result, as shown in FIG. 7, a large diameter fluctuation having a range of from +2 mm to −5 mm was generated on the drawing start side, and the diameter fluctuation was larger than that of Example 1.

Example 2

A glass preform having tapered portions at both ends thereof, a 1000 mm length usable region of the glass rod, a diameter of 168 mm at a drawing start position, a diameter of 172 mm at a drawing ending position, and a diameter in the usable region varying in a wavy form in the longitudinal direction was drawn under conditions where the heater length was 130 mm, the glass rod target diameter was 150 mm, and the feed speed was 10 mm/min. A preliminarily heated region on the drawing start side was set to 200 mm in length. Drawing reference distances with respect to a plurality of points located on the glass preform in the longitudinal direction at regular intervals of 100 mm were determined to be 46, 44, 41, 38, 38, 39, 43, 46, 49, 52 and 52 mm from the start end side of the glass preform. These drawing reference distances were determined from diameters at the plurality of points and using the data of FIG. 3A. The glass preform was positioned so that the drawing start position of the usable region on the drawing start side was located 154 mm above the heater middle position C and drawing was started at a heater temperature of 2050 degrees Celsius. A portion of the tapered portion on the drawing start side that had a diameter greater than 150 mm was drawn at a drawing speed calculated using the formula (1) while the target diameter of the portion was set to the 150 mm glass rod target diameter.

Figure 8:
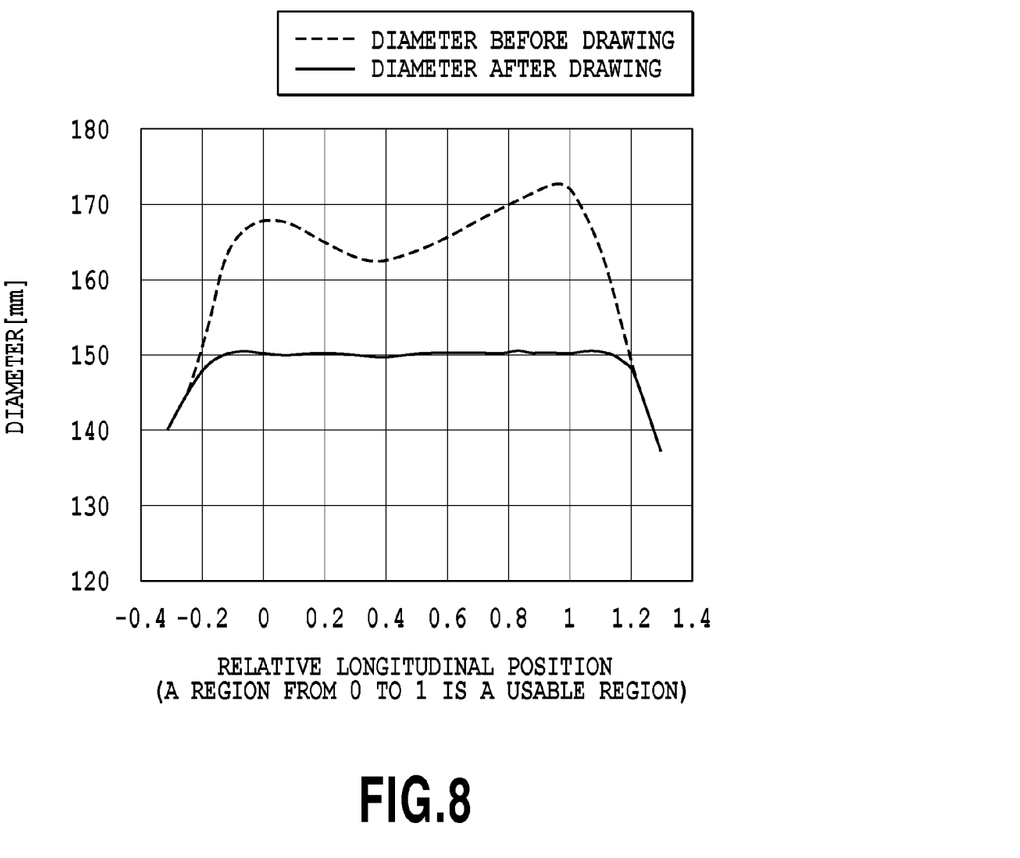
FIG. 8 is a graph illustrating a diameter fluctuation of a glass preform before and after drawing.

A feed amount of the glass preform was set to 0 mm at the time point that the 200 mm length of preliminarily heated region passed through the heater middle position C, and the glass preform was moved 98 mm. The first feed amount of 98 mm was determined from the interval of 100 mm+(the drawing reference distance of 44 mm at the second point of the plurality of points−the drawing reference distance of 46 mm at the first position of the plurality of points). During this time, the diameter acquisition distance with respect to given positions on the preform between the first and second positions were interpolated by multiplying the actual feed amount of the glass preform by 100/98. And, the drawing speed V2 was calculated using formula (1) using the diameter acquired from the measured diameter data of the glass preform at the interpolated diameter acquisition distance. The drawing was continued to the end of the usable region of the preform so that the drawing speed was sequentially determined in the same way at each interpolation region between the two adjacent points that define the region, from the plurality of points. In addition, another 200 mm length region was further drawn after the drawing of the usable region. The portion of the tapered portion on the drawing ending side that had a diameter greater than 150 mm was drawn at a drawing speed calculated using the formula (1) while the target diameter of the portion was set to the 150 mm glass rod target diameter. As a result, as shown in FIG. 8, a significantly reduced diameter fluctuation, in which the difference between the maximum diameter and the minimum diameter is approximately 0.9 mm, could be obtained.

INDUSTRIAL APPLICABILITY

According to the present invention, diameter fluctuation of a drawn glass rod in a longitudinal direction can be suppressed when drawing at a relatively large diameter reduction ratio.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method of fabricating a glass rod from an elongated glass preform using a furnace, the furnace extending between an input end and an opposing output end, the glass rod being fabricated so as to have a target diameter, the glass preform having a region thereof extending in a longitudinal direction between a drawing start position and a drawing end position, the distance between the drawing start position and the drawing end position defining a length of the region, the glass preform having a pre-drawn diameter that varies over the length of the region from a first initial diameter value at the drawing start position to a second initial diameter value at the drawing end position, the method comprising:
  determining first and second drawing reference distance values respectively corresponding to the drawing start and drawing end positions, the first and second drawing reference distance values being dependent on the first and second initial diameter values, a predetermined feed speed value, and the target diameter, the first and second drawing reference distance values each being defined by the following equation:

$$L = \frac{VM}{\pi \times \left(\frac{ND}{2}\right)^2},$$

where:
    L is the first or second drawing reference distance value,
    VM is the volume of the glass preform between a reference position of the furnace and a position PM of the furnace where a deformation rate of the glass preform is the greatest, and
    ND is the first or second initial diameter value of the glass preform;

feeding the glass preform longitudinally into the input end of the furnace at a feed speed such that a plurality of points longitudinally spaced along the region pass the reference position of the furnace as the glass preform is fed into the furnace, the feed speed being maintained at the predetermined feed speed value;
  drawing the glass preform from the output end of the furnace at a variable drawing speed as the glass preform is fed into the furnace, the variable drawing speed being controlled so that as each point of the region passes the reference position of the furnace, the following equation is satisfied:

$$\frac{V2}{V1} = \left(\frac{D}{d}\right)^2,$$

where:
    V2 is the variable drawing speed at the particular point of the region,
    V1 is the feed speed,
    D is the pre-drawn diameter of the glass preform at a diameter acquisition position corresponding to the particular point of the region, the diameter acquisition position being longitudinally separated from the particular point of the region by a drawing reference distance, and
    d is the target diameter of the glass rod,
  wherein the drawing reference distance varies between the first and second drawing reference distance values over the length of the region, the variance of the drawing reference distance at each point of the region with respect to the first drawing reference distance value being based on the longitudinal location of the corresponding point within the region,
  wherein the drawing reference distance transitions linearly from the first drawing reference distance value at the drawing start position to the second drawing reference distance value at the drawing end position, and
  wherein the drawing reference distance at each point of the region is determined by interpolating between the first and second drawing reference distance values.

2. A method of fabricating a glass rod from an elongated glass preform using a furnace, the furnace extending between an input end and an opposing output end, the glass rod being fabricated so as to have a target diameter, the glass preform having a region thereof extending in a longitudinal direction between a drawing start position and a drawing end position, the distance between the drawing start position and the drawing end position defining a length of the region, the glass preform having a pre-drawn diameter that varies over the length of the region from a first initial diameter value at the drawing start position to a second initial diameter value at the drawing end position, the method comprising:
  determining first and second drawing reference distance values respectively corresponding to the drawing start and drawing end positions, the first and second drawing reference distance values being dependent on the first and second initial diameter values, a predetermined feed speed value, and the target diameter;
  feeding the glass preform longitudinally into the input end of the furnace at a feed speed such that a plurality of points longitudinally spaced along the region pass a reference position of the furnace as the glass preform is fed into the furnace, the feed speed being maintained at the predetermined feed speed value;

drawing the glass preform from the output end of the furnace at a variable drawing speed as the glass preform is fed into the furnace, the variable drawing speed being controlled so that as each point of the region passes the reference position of the furnace, the following equation is satisfied:

$$\frac{V2}{V1} = \left(\frac{D}{d}\right)^2,$$

where:
V2 is the variable drawing speed at the particular point of the region,
V1 is the feed speed,
D is the pre-drawn diameter of the glass preform at a diameter acquisition position corresponding to the particular point of the region, the diameter acquisition position being longitudinally separated from the particular point of the region by a drawing reference distance, and
d is the target diameter of the glass rod,
wherein the drawing reference distance varies between the first and second drawing reference distance values over the length of the region, the variance of the drawing reference distance at each point of the region with respect to the first drawing reference distance value being based on the longitudinal location of the corresponding point within the region, and
wherein the first and second drawing reference distance values are determined using pre-existing relationship data defining a relationship between pre-drawn diameters and drawing reference distance values of glass preforms, the relationship being defined by the following equation:

$$L = \frac{VM}{\pi \times \left(\frac{ND}{2}\right)^2},$$

where:
L is the drawing reference distance value,
VM is the volume of the glass preform between the reference position of the furnace and a position PM of the furnace where a deformation rate of the glass preform is the greatest, and
ND is the pre-drawn diameter of the glass preform.

3. The method recited in claim 2, wherein the pre-existing relationship data includes drawing reference distances for glass preforms corresponding to various combinations of glass preform diameters, target diameters, and feed speeds, the drawing reference distances having been determined by measuring the actual shape of diameter decreasing regions of glass preforms.

4. A method of fabricating a glass rod from an elongated glass preform using a furnace, the furnace extending between an input end and an opposing output end, the glass rod being fabricated so as to have a target diameter, the glass preform having a region thereof extending in a longitudinal direction between a drawing start position and a drawing end position, the distance between the drawing start position and the drawing end position defining a length of the region, the glass preform having a pre-drawn diameter that varies over the length of the region from a first initial diameter value at the drawing start position to a second initial diameter value at the drawing end position, the method comprising:
determining first and second drawing reference distance values respectively corresponding to the drawing start and drawing end positions, the first and second drawing reference distance values being dependent on the first and second initial diameter values, a predetermined feed speed value, and the target diameter, the first and second drawing reference distance values each being defined by the following equation:

$$L = \frac{VM}{\pi \times \left(\frac{ND}{2}\right)^2},$$

where:
L is the first or second drawing reference distance value,
VM is the volume of the glass preform between a reference position of the furnace and a position PM of the furnace where a deformation rate of the glass preform is the greatest, and
ND is the first or second initial diameter value of the glass preform;
feeding the glass preform longitudinally into the input end of the furnace at a feed speed such that a plurality of points longitudinally spaced along the region pass the reference position of the furnace as the glass preform is fed into the furnace, the feed speed being maintained at the predetermined feed speed value;
drawing the glass preform from the output end of the furnace at a variable drawing speed as the glass preform is fed into the furnace, the variable drawing speed being controlled so that as each point of the region passes the reference position of the furnace, the following equation is satisfied:

$$\frac{V2}{V1} = \left(\frac{D}{d}\right)^2,$$

where:
V2 is the variable drawing speed at the particular point of the region,
V1 is the feed speed,
D is the pre-drawn diameter of the glass preform at a diameter acquisition position corresponding to the particular point of the region, the diameter acquisition position being longitudinally separated from the particular point of the region by a drawing reference distance, and
d is the target diameter of the glass rod,
wherein the drawing reference distance varies between the first and second drawing reference distance values over the length of the region, the variance of the drawing reference distance at each point of the region with respect to the first drawing reference distance value being based on the longitudinal location of the corresponding point within the region.

5. A method of fabricating a glass rod from an elongated glass preform using a furnace, the furnace extending between an input end and an opposing output end, the glass rod being fabricated so as to have a target diameter, the glass preform having a region thereof extending in a longitudinal direction between a drawing start position and a drawing end position, the distance between the drawing start position and the drawing end position defining a length of the region, the glass preform having a pre-drawn diameter that varies over the length of the region from a first initial diameter value at the drawing start position to a second initial diameter value at the drawing end position, the method comprising:

determining first and second drawing reference distance values respectively corresponding to the drawing start and drawing end positions, the first and second drawing reference distance values being dependent on the first and second initial diameter values, a predetermined feed speed value, and the target diameter, the first and second drawing reference distance values each being defined by the following equation:

$$L = \frac{VM}{\pi \times \left(\frac{ND}{2}\right)^2},$$

where:
L is the first or second drawing reference distance value,
VM is the volume of the glass preform between a reference position of the furnace and a position PM of the furnace where a deformation rate of the glass preform is the greatest, and
ND is the first or second initial diameter value of the glass preform;

feeding the glass preform longitudinally into the input end of the furnace at a feed speed such that a plurality of points longitudinally spaced along the region pass the reference position of the furnace as the glass preform is fed into the furnace, the feed speed being maintained at the predetermined feed speed value;

drawing the glass preform from the output end of the furnace at a variable drawing speed as the glass preform is fed into the furnace, the variable drawing speed being controlled so that as each point of the region passes the reference position of the furnace, the following equation is satisfied:

$$\frac{V2}{V1} = \left(\frac{D}{d}\right)^2,$$

where:
V2 is the variable drawing speed at the particular point of the region,
V1 is the feed speed,
D is the pre-drawn diameter of the glass preform at a diameter acquisition position corresponding to the particular point of the region, the diameter acquisition position being longitudinally separated from the particular point of the region by a drawing reference distance, and
d is the target diameter of the glass rod, wherein the drawing reference distance varies between the first and second drawing reference distance values over the length of the region, the variance of the drawing reference distance at each point of the region with respect to the first drawing reference distance value being based on the longitudinal location of the corresponding point within the region, and wherein the glass preform is preheated such that a temperature distribution at the drawing start position is steady before the drawing start position passes the reference position of the furnace.

6. A method of fabricating a glass rod from an elongated glass preform using a furnace, the furnace extending between an input end and an opposing output end, the glass rod being fabricated so as to have a target diameter, the glass preform having a region thereof extending in a longitudinal direction between a drawing start position and a drawing end position, the region having one or more longitudinally spaced apart intermediate positions disposed between the drawing start and drawing end positions, the region being comprised of a plurality of subregions, each subregion extending between a subregion start position and a subregion end position, the distance between the subregion start and end positions defining a length of the subregion, the glass preform having a pre-drawn diameter that varies over the length of each subregion from a first initial diameter value at the subregion start position to a second initial diameter value at the subregion end position, the subregion start and end positions corresponding to: the drawing start position and an intermediate position adjacent thereto, or the drawing end position and an intermediate position adjacent thereto, or two adjacent intermediate positions, the method comprising:

for each subregion, determining first and second drawing reference distance values respectively corresponding to the subregion start and end positions, the first and second drawing reference distance values being dependent on the first and second initial diameter values, a predetermined feed speed value, and the target diameter, the first and second drawing reference distance values for each subregion being defined by the following equation:

$$L = \frac{VM}{\pi \times \left(\frac{ND}{2}\right)^2},$$

where:
L is the first or second drawing reference distance value,
VM is the volume of the glass preform between a reference position of the furnace and a position PM of the furnace where a deformation rate of the glass preform is the greatest, and
ND is the first or second initial diameter value of the glass preform;

feeding the glass preform longitudinally into the input end of the furnace at a feed speed such that a plurality of points longitudinally spaced along each subregion pass the reference position of the furnace as the glass preform is fed into the furnace, the feed speed being maintained at the predetermined feed speed value;

drawing the glass preform from the output end of the furnace at a variable drawing speed as the glass preform is fed into the furnace, the variable drawing speed being controlled so that as each point of each subregion passes the reference position of the furnace, the following equation is satisfied:

$$\frac{V2}{V1} = \left(\frac{D}{d}\right)^2,$$

where:
V2 is the variable drawing speed at the particular point of the subregion,
V1 is the feed speed,
D is the pre-drawn diameter of the glass preform at a diameter acquisition position corresponding to the particular point of the subregion, the diameter acquisition position being longitudinally separated from the particular point of the subregion by a drawing reference distance, and d is the target diameter of the glass rod, wherein for each subregion, the drawing reference distance varies between the first and second drawing reference distance values corresponding to the subregion over the length of the subregion, the variance of the drawing reference distance at each point of the subregion with respect to the first drawing reference distance value corresponding to the subregion being based on the longitudinal location of the corresponding point within the subregion, wherein, for each subregion, the drawing reference distance transitions linearly from the first drawing reference distance value corresponding to the subregion at the subregion start position to the second drawing reference distance value corresponding to the subregion at the subregion end position, and wherein the drawing reference distance at each point of each subregion is determined by interpolating between the first and second drawing reference distance values corresponding to the subregion.

7. A method of fabricating a glass rod from an elongated glass preform using a furnace, the furnace extending between an input end and an opposing output end, the glass rod being fabricated so as to have a target diameter, the glass preform having a region thereof extending in a longitudinal direction between a drawing start position and a drawing end position, the region having one or more longitudinally spaced apart intermediate positions disposed between the drawing start and drawing end positions, the region being comprised of a plurality of subregions, each subregion extending between a subregion start position and a subregion end position, the distance between the subregion start and end positions defining a length of the subregion, the glass preform having a pre-drawn diameter that varies over the length of each subregion from a first initial diameter value at the subregion start position to a second initial diameter value at the subregion end position, the subregion start and end positions corresponding to: the drawing start position and an intermediate position adjacent thereto, or the drawing end position and an intermediate position adjacent thereto, or two adjacent intermediate positions, the method comprising:

for each subregion, determining first and second drawing reference distance values respectively corresponding to the subregion start and end positions, the first and second drawing reference distance values being dependent on the first and second initial diameter values, a predetermined feed speed value, and the target diameter;

feeding the glass preform longitudinally into the input end of the furnace at a feed speed such that a plurality of points longitudinally spaced along each subregion pass a reference position of the furnace as the glass preform is fed into the furnace, the feed speed being maintained at the predetermined feed speed value;

drawing the glass preform from the output end of the furnace at a variable drawing speed as the glass preform is fed into the furnace, the variable drawing speed being controlled so that as each point of each subregion passes the reference position of the furnace, the following equation is satisfied:

$$\frac{V2}{V1} = \left(\frac{D}{d}\right)^2,$$

where:
V2 is the variable drawing speed at the particular point of the subregion,
V1 is the feed speed,
D is the pre-drawn diameter of the glass preform at a diameter acquisition position corresponding to the particular point of the subregion, the diameter acquisition position being longitudinally separated from the particular point of the subregion by a drawing reference distance, and
d is the target diameter of the glass rod, wherein for each subregion, the drawing reference distance varies between the first and second drawing reference distance values corresponding to the subregion over the length of the subregion, the variance of the drawing reference distance at each point of the subregion with respect to the first drawing reference distance value corresponding to the subregion being based on the longitudinal location of the corresponding point within the subregion, and wherein the first and second drawing reference distance values corresponding to each subregion are determined using pre-existing relationship data defining a relationship between pre-drawn diameters and drawing reference distance values of glass preforms, the relationship being defined by the following equation:

$$L = \frac{VM}{\pi \times \left(\frac{ND}{2}\right)^2},$$

where:
L is the drawing reference distance value,
VM is the volume of the glass preform between the reference position of the furnace and a position PM of the furnace where a deformation rate of the glass preform is the greatest, and
ND is the pre-drawn diameter of the glass preform.

8. A method of fabricating a glass rod from an elongated glass preform using a furnace, the furnace extending between an input end and an opposing output end, the glass rod being fabricated so as to have a target diameter, the glass preform having a region thereof extending in a longitudinal direction between a drawing start position and a drawing end position, the region having one or more longitudinally spaced apart intermediate positions disposed between the drawing start and drawing end positions, the region being comprised of a plurality of subregions, each subregion extending between a subregion start position and a subregion end position, the distance between the subregion start and end positions defining a length of the subregion, the glass preform having a pre-drawn diameter that varies over the length of each subregion from a first initial diameter value at the subregion start position to a second initial diameter value at the subregion end position, the subregion start and end positions corresponding to: the drawing start position and an intermediate position adjacent thereto, or the drawing end position and an intermediate position adjacent thereto, or two adjacent intermediate positions, the method comprising:

for each subregion, determining first and second drawing reference distance values respectively corresponding to the subregion start and end positions, the first and second drawing reference distance values being dependent on the first and second initial diameter values, a predetermined feed speed value, and the target diameter, the first and second drawing reference distance values for each subregion being defined by the following equation:

$$L = \frac{VM}{\pi \times \left(\frac{ND}{2}\right)^2},$$

where:
L is the first or second drawing reference distance value,
VM is the volume of the glass preform between a reference position of the furnace and a position PM of the furnace where a deformation rate of the glass preform is the greatest, and
ND is the first or second initial diameter value of the glass preform;

feeding the glass preform longitudinally into the input end of the furnace at a feed speed such that a plurality of points longitudinally spaced along each subregion pass the reference position of the furnace as the glass preform is fed into the furnace, the feed speed being maintained at the predetermined feed speed value;

drawing the glass preform from the output end of the furnace at a variable drawing speed as the glass preform is fed into the furnace, the variable drawing speed being controlled so that as each point of each subregion passes the reference position of the furnace, the following equation is satisfied:

$$\frac{V2}{V1} = \left(\frac{D}{d}\right)^2,$$

where:
V2 is the variable drawing speed at the particular point of the subregion,
V1 is the feed speed,
D is the pre-drawn diameter of the glass preform at a diameter acquisition position corresponding to the particular point of the subregion, the diameter acquisition position being longitudinally separated from the particular point of the subregion by a drawing reference distance, and
d is the target diameter of the glass rod,
wherein for each subregion, the drawing reference distance varies between the first and second drawing reference distance values corresponding to the subregion over the length of the subregion, the variance of the drawing reference distance at each point of the subregion with respect to the first drawing reference distance value corresponding to the subregion being based on the longitudinal location of the corresponding point within the subregion.

* * * * *